United States Patent
Oikawa et al.

(10) Patent No.: US 7,062,027 B2
(45) Date of Patent: Jun. 13, 2006

(54) SERVICE CONTROL APPARATUS, FORWARDING SWITCHING EQUIPMENT, SERVICE CONTROL SYSTEM, AND SERVICE CONTROL METHOD

(75) Inventors: Yasuyuki Oikawa, Yokohama (JP);
Kazuyuki Kozu, Yokosuka (JP);
Takeshi Sugiyama, Yokosuka (JP);
Mutsumaru Miki, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 422 days.

(21) Appl. No.: 10/457,489

(22) Filed: Jun. 10, 2003

(65) Prior Publication Data

US 2004/0013257 A1  Jan. 22, 2004

(30) Foreign Application Priority Data

Jul. 19, 2002  (JP) ............................. 2002-211512

(51) Int. Cl.
*H04M 3/42* (2006.01)
*H04M 7/00* (2006.01)

(52) U.S. Cl. ............................. 379/211.02; 379/221.08; 455/417

(58) Field of Classification Search ................ 379/219, 379/220.01, 221.01, 221.08–221.1, 221.13, 379/229, 230, 211.02; 455/417, 432.3
See application file for complete search history.

(56) References Cited

U.S. PATENT DOCUMENTS

| | | | |
|---|---|---|---|
| 5,504,804 A * | 4/1996 | Widmark et al. .......... 455/63.2 |
| 5,818,919 A | 10/1998 | Berberich, Jr. et al. | |
| 5,852,660 A | 12/1998 | Lindquist et al. | |
| 5,867,784 A * | 2/1999 | Lantto ..................... 455/432.2 |
| 5,912,897 A | 6/1999 | Steinbach | |
| 5,940,490 A * | 8/1999 | Foster et al. ............ 379/211.02 |
| 6,122,510 A * | 9/2000 | Granberg ..................... 455/433 |
| 6,438,223 B1 * | 8/2002 | Eskafi et al. ............ 379/221.13 |
| 6,560,327 B1 * | 5/2003 | McConnell .................. 379/229 |
| 6,647,259 B1 * | 11/2003 | Boyle et al. ................. 455/417 |
| 6,882,838 B1 * | 4/2005 | Lee et al. .................... 455/417 |
| 6,914,973 B1 * | 7/2005 | Marsico ................. 379/221.13 |
| 2002/0093945 A1 * | 7/2002 | Vesterinen .................. 370/352 |
| 2002/0168060 A1 * | 11/2002 | Huie ....................... 379/211.02 |

(Continued)

FOREIGN PATENT DOCUMENTS

EP  0 631 457  12/1994

(Continued)

OTHER PUBLICATIONS

J. D. Humphrey, et al., 6th IEE Conference on Telecommunications, No. 451, pp. 250-257, XP-000880801, "Interworking and the IN Platform: Detailing the Development of the GSM Camel Standard for Interworking IN", Mar. 29, 2003.

(Continued)

*Primary Examiner*—Benny Quoc Tieu
(74) *Attorney, Agent, or Firm*—Oblon, Spivak, McClelland, Maier & Neustadt, P.C.

(57) ABSTRACT

An SCP is provided with a pattern notifying unit. The pattern notifying unit is configured so that, on the occasion of providing a service utilizing ISUP interwork between a first leg defined between an originating switching center and a forwarding MSC and a second leg defined between forwarding MSC and a receiving MSC, it notifies the forwarding MSC of an interwork pattern number corresponding to a category of the service. The forwarding MSC according to the present invention performs processes such as "abandon and then generate" and "transmit" to parameters with reference to an interwork pattern corresponding to the interwork pattern number provided.

14 Claims, 5 Drawing Sheets

U.S. PATENT DOCUMENTS

2003/0100304 A1 * 5/2003 Hazelwood .................. 455/433

FOREIGN PATENT DOCUMENTS

WO  WO 97/48186  12/1997

OTHER PUBLICATIONS

Patent Abstracts of Japan, JP 2001-308968, Nov. 2, 2001 (with Engilsh Claims).

* cited by examiner

| PARAMETER | VALUE |
|---|---|
| A | a |
| B | b |
| C | c |
| D | d |

(b)

| PARAMETER | VALUE |
|---|---|
| A | a' |
| B | b |
| C | c |
| E | e |

SERVICE CONTROL APPARATUS, FORWARDING SWITCHING EQUIPMENT, SERVICE CONTROL SYSTEM, AND SERVICE CONTROL METHOD

BACKGROUND OF THE INVENTION

1. Field of the Invention

The present invention relates to service control apparatus, forwarding switching equipment, a service control system, and a service control method.

2. Related Background Art

Conventionally, the CAMEL (Customized Applications for Mobile Enhanced Logic) services including incoming-call forwarding and international roaming were proposed as IN (Intelligent Network) services in 3GPP (The 3rd Generation Partnership Project). When the incoming-call forwarding process is carried out by use of the CAMEL services, there are cases where charge accounts of communication fees and/or connection conditions are different between a section from an originator to a forwarding point (first leg) and a section from the forwarding point to a destination (second leg).

In such cases, in order to implement seamless connection between the first leg and the second leg, it is necessary to effect the interwork (equivalent to interworking) using ISUP (ISDN User Part). Since ISUP is the known, common data part, the detailed description thereof is omitted herein, but it is one of the user parts for which the procedure for implementing ISDN by the common channel signaling system is defined in the functional configuration model of Signaling System No. 7.

SUMMARY OF THE INVENTION

In the above prior art, however, an MSC (Mobile Switching Center) as a forwarding switching center transmits all parameters on a signal received from the originating switching center, independent of types of services, to an SCP (Service Control Point) as a service control apparatus. Then the SCP rewrites the parameters according to individual service conditions and transmits the rewritten parameters to a receiving MSC, thereby implementing the ISUP interwork.

There was thus concern that the volume of data (e.g., control signals) transmitted and received between MSC and SCP became so large as to lower the throughput (substantial volume of data transmitted per unit time). Furthermore, parameter deleting capability in SCP is unprescribed in the 3GPP-based CAMEL services. For this reason, it was difficult to apply the ISUP interwork requiring deletion of any unnecessary parameter, to systems consisting of MSC and SCP.

The present invention has been accomplished in view of the above problem and an object of the invention is to implement efficient call processing while preventing increase in the volume of data transmitted and received between the service control apparatus (equivalent to SCP) and the forwarding switching center (equivalent to MSC).

In order to solve the above problem, a service control apparatus according to the present invention is a service control apparatus (SCP) comprising notifying means for, on the occasion of providing a service utilizing ISUP interwork between a first leg defined between an originating switching center and a call-forwarding switching center (forwarding MSC) and a second leg defined between the forwarding switching center and a call-receiving switching center (receiving MSC), notifying the forwarding switching center of interwork pattern identification information corresponding to a category of the service.

A forwarding switching center according to the present invention is forwarding switching equipment for transmitting and receiving data to and from the aforementioned service control apparatus, the forwarding switching equipment comprising: storage means for storing an interwork pattern in which a parameter received from the originating switching center is correlated with a process to the parameter, for every interwork pattern identification information; and processing means for performing the process to the parameter with reference to the interwork pattern corresponding to the interwork pattern identification information notified of by the notifying means of the service control apparatus.

The invention may also be applied to construction of a service control system comprising the aforementioned service control apparatus and the aforementioned forwarding switching equipment and configured to implement communication between the service control apparatus and the forwarding switching equipment.

A service control method according to the present invention is a service control method comprising a notification step wherein, on the occasion of providing a service utilizing ISUP interwork between a first leg defined between an originating switching center and a call-forwarding switching center (forwarding MSC) and a second leg defined between the forwarding switching center and a call-receiving switching center (receiving MSC), a service control apparatus (SCP) notifies the forwarding switching center of interwork pattern identification information corresponding to a category of the service.

Another service control method according to the present invention is a service control method comprising a processing step wherein a call-forwarding switching center comprising storage means storing an interwork pattern in which a parameter received from an originating switching center is correlated with a process to the parameter, for every interwork pattern identification information, performs the process to the parameter with reference to the interwork pattern corresponding to the interwork pattern identification information notified of by a service control apparatus.

According to these aspects of the invention, the service control apparatus transmits to the forwarding switching center, the identification information of an interwork pattern which the forwarding switching center is instructed to use. The forwarding switching center performs each parameter process with reference to the interwork pattern specified by the identification information. Namely, the processes to parameters, e.g., "abandon and then generate," "transmit," etc., are not executed on the service control apparatus side but executed on the forwarding switching center side.

For this reason, the forwarding switching center does not have to transmit any of the parameters on the signal received from the originating switching center, to the service control apparatus. This decreases the volume of data transmitted and received between the forwarding switching center and the service control apparatus on the occasion of implementing the ISUP interwork and suppresses the drop of throughput in the system. As a consequence, it becomes feasible to effect efficient call processing while preventing the increase in the volume of data transmitted and received between the service control apparatus and the forwarding switching center.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5A is a diagram showing the parameters before mapping and FIG. 5B a diagram showing the parameters after mapping.

DESCRIPTION OF THE PREFERRED EMBODIMENTS

An embodiment in which the present invention is applied to the incoming-call forwarding service being one of the IN services will be described below in detail with reference to the accompanying drawings.

Figure 1:
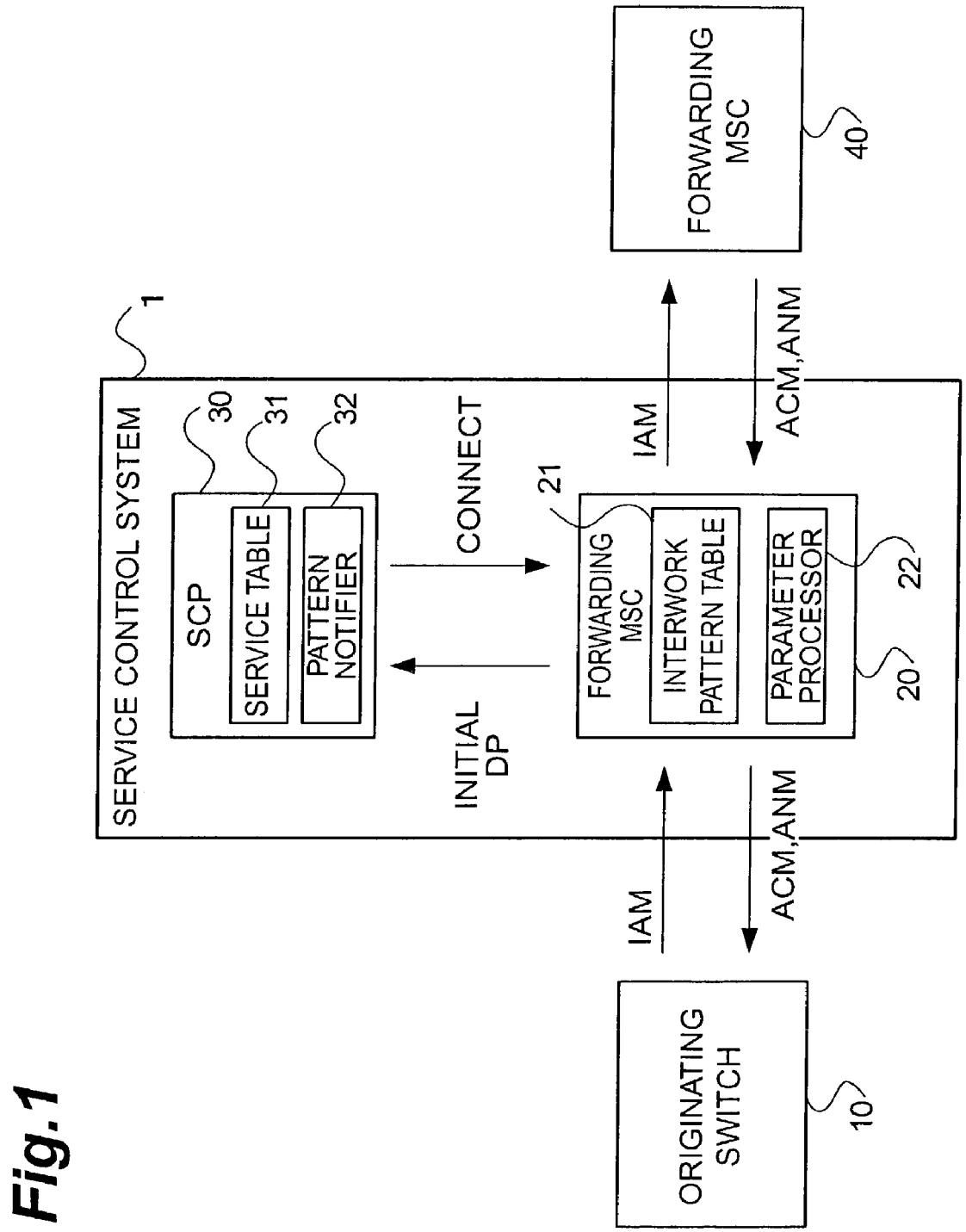
FIG. 1 is a conceptual diagram showing the configuration of the service control system.

First, a configuration will be described. FIG. 1 is a conceptual diagram showing the overall configuration of service control system 1 in the present embodiment. As shown in FIG. 1, the service control system 1 is comprised of at least forwarding MSC (Mobile Switching Center) 20 and SCP (Service Control Point) 30. The forwarding MSC 20 and SCP 30 are wired to each other so as to be able to transmit and receive various data between them. The forwarding MSC 20 is wired to originating switching center 10 and to receiving MSC 40.

The originating switching center 10 puts parameters A to D on an IAM (Initial Address Message) and transmits it to the forwarding MSC 20. The IAM is a connect request signal being one of the ISUP messages.

The originating switching center 10 receives an ACM (Address Complete Message) and an ANM (ANswer Message) from the forwarding MSC 20. The ACM is one of the ISUP messages and a signal notifying that a route of switching equipment to a correspondent has been specified. The ANM is one of the ISUP message and a signal notifying that a communicable state with the correspondent was established.

Figure 2:
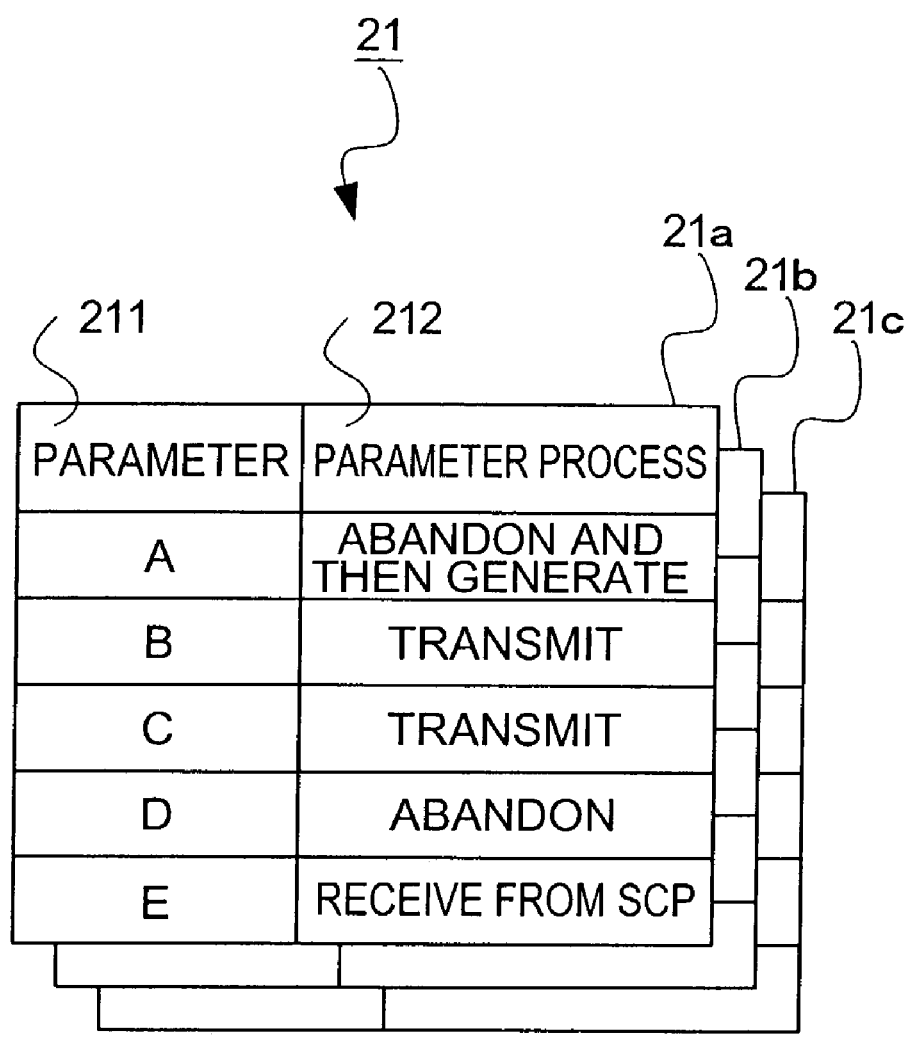
FIG. 2 is a diagram conceptually showing a data storage example of the interwork pattern table.

The forwarding MSC 20 (corresponding to the forwarding switching center) has an interwork pattern table 21 (corresponding to the storage means) inside. FIG. 2 is a diagram showing a data storage example of the interwork pattern table 21. As shown in FIG. 2, the interwork pattern table 21 is comprised of interwork patterns 21a, 21b, and 21c corresponding to respective interwork pattern numbers #1, #2, and #3 (corresponding to the interwork pattern identification information).

Furthermore, the interwork pattern 21a is comprised of parameter area 211 and parameter process area 212, in which parameters and parameter processes are stored in correlation with each other. The parameter area 211 stores parameters (e.g., A, B, C, D, E) that can be transmitted from the originating switching center 10, and the parameter process area 212 stores types of processes (e.g., "abandon and then generate," "transmit," "abandon," "receive from SCP") to be executed to the corresponding parameters.

Specifically, for example, the parameter A is a parameter for display of connection characteristics and can be further separated into a satellite connection display parameter A1, a continuity check display parameter A2, an echo canceller display parameter A3, and so on. Likewise, the parameter B is a parameter for display of forward call, and may be further separated into a national/international call display parameter B1, an end-to-end connection display parameter B2, an interconnection display parameter B3, an end-to-end information display parameter B4, an ISUP1 link display parameter B5, an ISUP1 link choice display parameter B6, an ISDN access display parameter B7, and an SCCP method display parameter B8.

Furthermore, the parameters C, D, and E are an originating user class parameter, a communication route request display parameter, and a terminating number parameter, respectively. In addition to the above parameters, the other parameters assumed in the incoming-call forwarding service include those of calling line identity, redirection number, call forwarding information, first called party number, access transport, user service information, generic number, charge area information, caller ID non-display reason, additional user class, carrier information transport, and so on.

The forwarding MSC 20 is provided with a parameter processor 22 (corresponding to the processing means). The parameter processor 22 selects an interwork pattern to be referred to, based on the interwork pattern number out of #1, #2, and #3, which was notified of by SCP 30. Then the parameter processor 22 performs the parameter processes corresponding to the respective parameters A–E, with reference to the selected interwork pattern.

The forwarding MSC 20 receives the IAM from the originating switching center 10 and sends the ACM and ANM to the originating switching center 10.

The forwarding MSC 20 transmits an InitialDP (Detection Point) to the SCP 30 and receives a Connect from the SCP 30. The InitialDP herein is a control signal being one of CAP (CAMEL Applications Part) signals compliant with the CAMEL control signaling system. The Connect is one of the CAP signals and a signal notifying the MSC of an interwork pattern number and a parameter.

Furthermore, the forwarding MSC 20 transmits an IAM to the receiving MSC 40 and receives an ACM and an ANM from the receiving MSC 40.

The SCP 30 (corresponding to the service control apparatus) is provided with at least service table 31 and pattern notifying unit 32.

Figure 3:
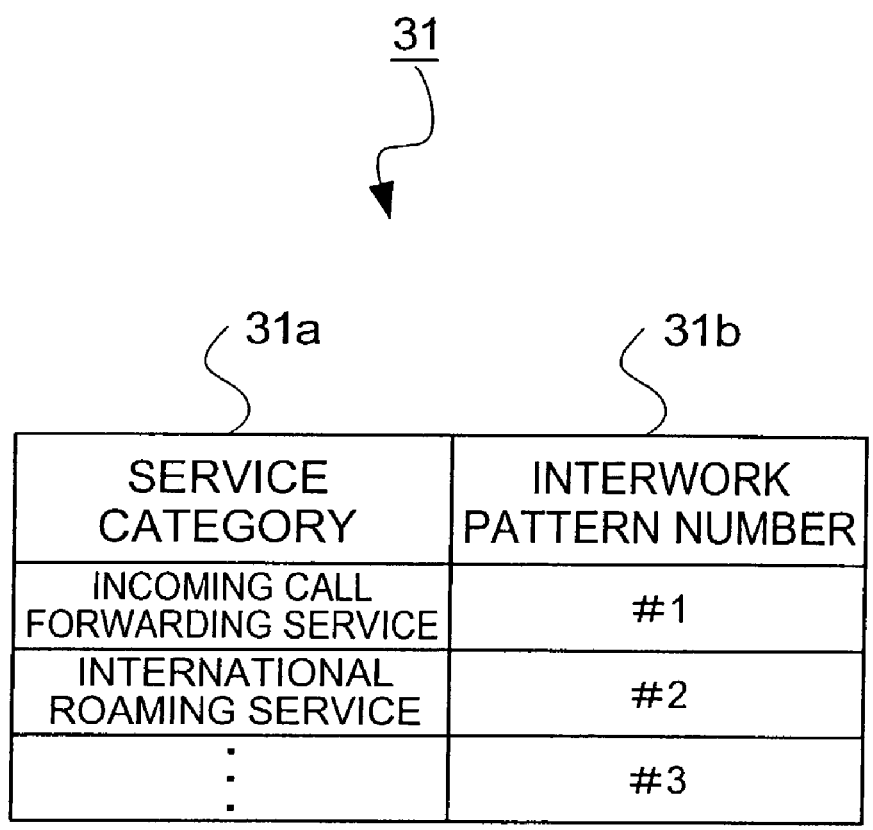
FIG. 3 is a diagram conceptually showing a data storage example of the service table.

FIG. 3 is a diagram showing a data storage example of the service table 31. As shown in FIG. 3, the service table 31 is comprised of service category area 31a and interwork pattern number area 31b, in which service categories and interwork pattern numbers are stored in correlation with each other.

The service category area 31a stores categories of services (e.g., "incoming-call forwarding service," "international roaming service,". . . ) that can be provided in the service control system 1.

The interwork pattern number area 31b stores as "interwork pattern numbers" identification information (e.g., "#1," "#2," "#3," . . . ) that can uniquely specify the interwork pattern which the forwarding MSC 20 is instructed to refer to.

Some service categories stored in the service category area 31*a* can be further segmentalized according to conditions of the ISUP interwork for provision of corresponding services. The incoming-call forwarding service can be categorized, for example, into cases where the incoming-call destination is an international carrier, a PHS (Personal Handyphone System), or a caller-paying pocket pager, in view of the incoming-call destination.

When the SCP 30 receives the InitialDP from the forwarding MSC 20, the pattern notifying unit 32 determines the foregoing interwork pattern number and parameter according to the service category and transmits the Connect therewith to the forwarding MSC 20. This notifies the forwarding MSC 20 of the interwork pattern to which the forwarding MSC 20 is to refer, and the parameter used according to necessity as well.

The receiving MSC 40 (corresponding to the receiving switching center) receives the IAM from the forwarding MSC 20 and sends the ACM and ANM to the forwarding MSC 20.

Figure 4:
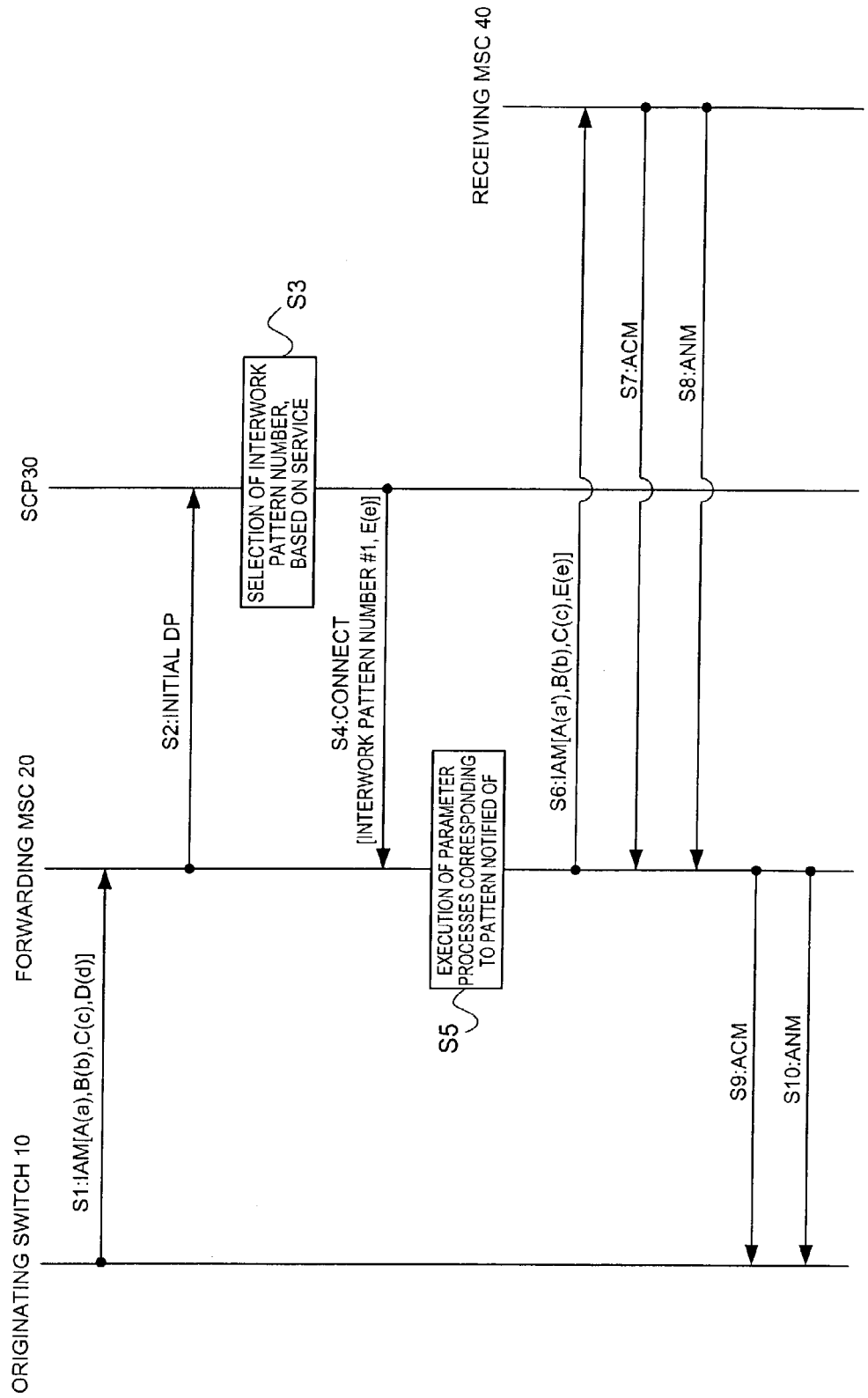
FIG. 4 is a flowchart for explaining the operation of the service control system.

The operation of the service control system 1 according to the present invention will be described below. In addition thereto, each of steps being the components of the service control method according to the present invention will be described. The operation will be described based on the premise of notation that the parameters A, B, C, and D having their respective values a, b, c, and d are denoted by A(a), B(b), C(c), and D(d). FIG. 4 is a flowchart for explaining the service control processing executed by the service control system 1.

In S1, the forwarding MSC 20 receives the IAM containing the parameters A(a)–D(d), which was transmitted from the originating switching center 10.

In S2, the forwarding MSC 20 transmits the foregoing InitialDP to the SCP 30.

In S3, the SCP 30 determines the category of the service to be started, based on the InitialDP received in S2, and selects and extracts an interwork pattern number from the service table 31 on the basis of the determination result. The step S3 may be configured so that the SCP 30 first determines whether the ISUP interwork is necessary, on the basis of the service category, and so that, only when it is determined that the ISUP interwork is necessary, the interwork pattern number is selected and extracted.

In S4, the SCP 30 notifies the forwarding MSC 20 of the interwork pattern number extracted in S3 (#1 in the example of FIG. 4) and a parameter (E(e) in the example of FIG. 4) through the Connect.

In S5, the forwarding MSC 20 executes the interwork corresponding to the interwork pattern number notified of in S4. Namely, the forwarding MSC 20 refers to the interwork pattern table 21 and maps the parameters for the zone between forwarding MSC 20 and SCP 30 (hereinafter referred to as "first leg") to those for the zone between SCP 30 and receiving MSC 40 (hereinafter referred to as "second leg") with reference to the interwork pattern table 21 (parameter conversion).

An example of the mapping of parameters A–D from the first leg to the second leg will be described below in more detail with reference to FIG. 2, FIG. 5A, and FIG. 5B. As shown in FIG. 5A, the parameters A–D before the mapping have their respective values a–d. For example, it is determined that the parameter process to A(a) is "abandon and then generate" with reference to the interwork pattern 21*a*. Accordingly, as shown in FIG. 5B, the forwarding MSC 20 abandons the value a and then generates a value a' as a substitute.

Subsequently, concerning the parameters B(b) and C(c), the parameter processes thereto both are "transmit." Therefore, the existing values b, c are retained as values after the mapping. Since the parameter process to the parameter D(d) is "abandon," the forwarding MSC 20 deletes the parameter D(d). As a consequence, the value d will not be transported to the receiving MSC 40. The parameter process to the parameter E(e) is "receive from SCP." Therefore, the parameter E(e) received from SCP 30 in S4 is newly added to the parameters after the mapping.

In S6, the parameters A(a'), B(b), C(c), and E(e) resulting from the mapping by the forwarding MSC 20 in S5 are transported to the receiving MSC 40. This permits the forwarding MSC 20 to be connected to the receiving MSC 40 through these parameters.

In S7 and S8, the receiving MSC 40 sends the ACM and ANM to the forwarding MSC 20.

In S9 and S10, the forwarding MSC 20 sends the ACM and ANM to the originating switching center 10.

In the service control system 1 according to the present invention, as described above, when the SCP 30 receives the InitialDP from the forwarding MSC 20, the SCP 30 selects the identification number of the interwork pattern and the parameter that the forwarding MSC 20 will necessitate on the occasion of executing the ISUP interwork, and then notifies the forwarding MSC 20 of them. The forwarding MSC 20 acquires the interwork pattern corresponding to the interwork pattern number thus notified of, from the interwork pattern table 21 and performs the mapping of the parameters while adequately adding the parameter notified of. This mapping completes the connection based on the incoming-call forwarding service (ISUP interwork) between the forwarding MSC 20 and the receiving MSC 40.

In the service control system 1 in the present embodiment, the parameter processes are not executed in SCP 30 but executed in the forwarding MSC 20. For this reason, the forwarding MSC 20 does not have to transmit any of the parameters A(a)–D(d) on the signal received from the originating switching center 10, to the SCP 30. This decreases the volume of data transmitted and received between the forwarding MSC 20 and SCP 30 on the occasion of implementing the ISUP interwork and suppresses the drop of throughput in the service control system 1. As a consequence, it becomes feasible to prevent the increase in the volume of data transmitted and received between forwarding MSC 20 and SCP 30 and thereby implement the efficient incoming-call forwarding processing.

The mode described in the present embodiment is just a preferred example of the service control system according to the present invention and the present invention is by no means intended to be limited to the mode. For example, the present embodiment exemplified the incoming-call forwarding service as a CAMEL service utilizing the ISUP interwork, but, without having to be limited to this example, the present invention can also be applied to the international roaming service and other services.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A service control apparatus comprising notifying means for, on the occasion of providing a service utilizing ISUP interwork between a first leg defined between an originating switching center and a call-forwarding switching center and a second leg defined between the call-forwarding switching center and a call-receiving switching center, notifying the call-forwarding switching center of interwork pattern identification information corresponding to a category of service.

2. Forwarding switching equipment for transmitting and receiving data to and from a service control apparatus comprising notifying means for, on the occasion of providing a service utilizing ISUP interwork between a first leg defined between an originating switching center and a call-forwarding switching center and a second leg defined between the call-forwarding switching center and a call-receiving switching center, notifying the call-forwarding switching center of interwork pattern identification information corresponding to a category of service, said forwarding switching equipment comprising:
    storage means for storing an interwork pattern in which a parameter received from the originating switching center is correlated with a process to the parameter, for every said interwork pattern identification information; and
    processing means for performing the process to the parameter with reference to the interwork pattern corresponding to the interwork pattern identification information notified of by the notifying means of the service control apparatus.

3. A service control system comprising:
    a service control apparatus including notifying means for, on the occasion of providing a service utilizing ISUP interwork between a first leg defined between an originating switching center and a call-forwarding switching center and a second leg defined between the call-forwarding switching center and a call-receiving switching center, notifying the call-forwarding switching center of interwork pattern identification information corresponding to a category of service;
    forwarding switching equipment including,
        storage means for storing an interwork pattern in which a parameter received from the originating switching center is correlated with a process to the parameter, for every said interwork pattern identification information; and
        processing means for performing the process to the parameter with reference to the interwork pattern corresponding to the interwork pattern identification information notified of by the notifying means of the service control apparatus, and communication means for communicating between the service control apparatus and the forwarding switching equipment.

4. A service control method comprising a notification step wherein, on the occasion of providing a service utilizing ISUP interwork between a first leg defined between an originating switching center and a call-forwarding switching center and a second leg defined between the call-forwarding switching center and a call-receiving switching center, a service control apparatus notifies the call-forwarding switching center of interwork pattern identification information corresponding to a category of service.

5. A service control method comprising a processing step wherein a call-forwarding switching center comprising storage means storing an interwork pattern in which a parameter received from an originating switching center is correlated with a process to the parameter, for every interwork pattern identification information, performs the process to the parameter with reference to the interwork pattern corresponding to the interwork pattern identification information notified of by a service control apparatus.

6. A service control apparatus comprising:
    a notifying unit configured to notifying a call-forwarding switching center of interwork pattern identification information corresponding to a category of service when providing a service utilizing ISUP interwork between a first leg defined between an originating switching center and the call-forwarding switching center and a second leg defined between the call-forwarding switching center and a call-receiving switching center.

7. Forwarding switching equipment for transmitting and receiving data to and from a service control apparatus including a notifying unit configured to notifying a call-forwarding switching center of interwork pattern identification information corresponding to a category of service when providing a service utilizing ISUP interwork between a first leg defined between an originating switching center and the call-forwarding switching center and a second leg defined between the call-forwarding switching center and a call-receiving switching center, said forwarding switching equipment comprising:
    a storage unit configured to store an interwork pattern in which a parameter received from the originating switching center is correlated with a process to the parameter, for every said interwork pattern identification information; and
    a processor configured to perform the process to the parameter with reference to the interwork pattern corresponding to the interwork pattern identification information notified of by the notifying unit of the service control apparatus.

8. A service control method comprising:
    receiving an initial address message from an originating switch, the initial address message including at least one parameter;
    sending an initial detection point message to a service control apparatus;
    receiving a connect message from the service control apparatus, the connect message including interwork pattern identification information corresponding to a category of service;
    processing the at least one parameter with reference to the interwork pattern corresponding to the interwork pattern identification information received from the service control apparatus to create at least one processed parameter; and
    sending an initial address message to a receiving mobile switching center, the initial address message including the at least one processed parameter.

9. The service control method recited in claim 8, further comprising:
    receiving an address complete message from the receiving mobile switching center; and
    receiving an answer message from the receiving mobile switching center.

10. The service control method recited in claim 9, further comprising:
    sending an address complete message to the originating switch; and
    sending an answer message to the originating switch.

11. The service control method recited in claim 8, wherein the connect message also includes at least one parameter.

12. The service control method recited in claim 11, wherein the processing includes replacing at least one parameter received in the initial address message with at least one parameter received in the connect message.

13. The service control method recited in claim 8, wherein the processing includes:

abandoning at least one parameter received in the initial address message; and, generating a parameter to replace each abandoned parameter.

14. The service control method recited in claim 8, wherein the processing includes saving at least one parameter received in the initial address message without any modifications.

* * * * *